Patented Nov. 14, 1922.

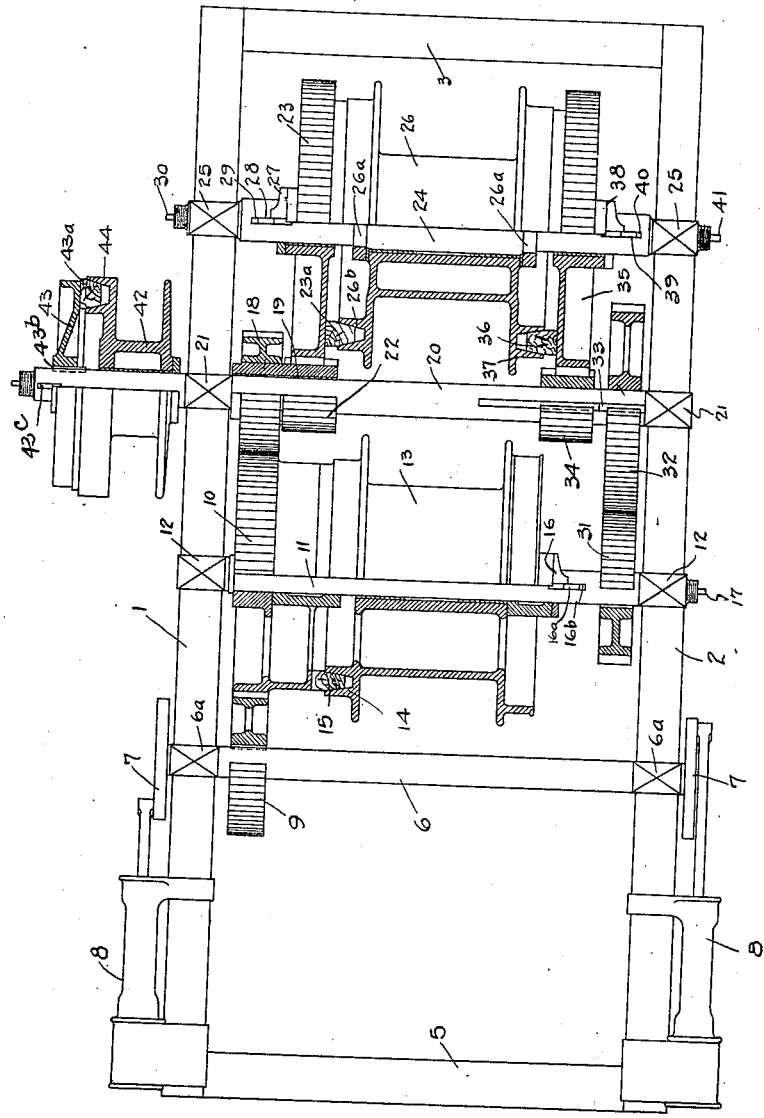

1,435,290

UNITED STATES PATENT OFFICE.

SIDNEY B. GORBUTT, OF PORTLAND, OREGON.

LOGGING ENGINE.

Application filed May 4, 1920. Serial No. 378,807.

*To all whom it may concern:*

Be it known that I, SIDNEY B. GORBUTT, a subject of Great Britain, residing at Portland, in the county of Multnomah and State of Oregon, have invented new and useful Improvements in Logging Engines, of which the following is a specification.

In the operation of logging engines it is particularly desirable to have the main line drum so driven that its speed may be instantly changed so that in handling logs the greatest speed possible may be given and at the same time there may be sufficient power to handle logs in difficult positions or exceptionally heavy logs. It is also desirable to have the trip line drum operate at a relatively high speed and this speed can be and desirably is uniform because it has a fairly constant load under all conditions. It is also desirable to provide an intermediate or out-board drum which has a speed between the trip line and the main drums. It is also desirable to have a back gearing by means of which high speed motors, such as electric motors and explosive engines may be used. These purposes are accomplished in the present invention. The details with relation to the same will appear from the specification and claims.

The invention is illustrated in the accompanying drawings in which the figure is a plan view of a logging engine, parts being in section to better show construction.

The frame is made up of the sides 1 and 2 with the cross beams 3 and 5. A crank shaft or initial gear shaft 6 is mounted in bearings 6ª on the sides 1 and 2 and is provided with cranks 7 at each end which are parts of the engines 8, the engines being supplied by a usual boiler (not shown).

A gear 9 is fixed on the crank shaft 6 and meshes with a gear 10 fixed on a shaft 11. The shaft 11 is journaled in bearings 12 on the sides 1 and 2 and a trip drum 13 is journaled on the shaft 11. The trip drum is provided with the friction surfaces 14 which engage the driving surfaces 15 on the gear 10 in the usual manner. A collar 16 is arranged on the shaft 11 abutting the drum 13. A key 16ª operates against the collar 16. The key extends through a slot 16ᵇ in the shaft 11 and is operated upon by a push pin 17 forming a part of the usual friction mechanism (not shown).

The high speed gearing connection is as follows: The gear 10 meshes with a gear 18. The gear 18 is fixed on a sleeve 19 journaled on the intermediate shaft 20. The shaft 20 is journaled in bearings 21 on the sides 1 and 2. A gear 22 is also fixed on the sleeve 19 and meshes with a gear 23 journaled on a shaft 24. The shaft is journaled in bearings 25 on the sides 1 and 2. A drum 26 is arranged on the shaft 24 and locked against endwise movement by the collars 26ª—26ª. A driving friction surface 23ª is arranged on the gear 23 and operates on the friction surfaces 26ᵇ on the drum 26. A thrust collar 27 operates against the hub of the gear 23. A cross key 28 operates on the collar. The cross key 28 is mounted in a slot 29 in the shaft 24 and is operated upon by a push pin 30 forming a part of the usual friction device (not shown).

The low speed gear connection is as follows: A gear 31 is fixed on the shaft 11 and meshes with a gear 32 fixed on the shaft 20 by means of a key 33. A gear 34 is also fixed on the shaft 20 by the key 33 and meshes with a gear 35 journaled on the shaft 24. The gear 35 is provided with a friction driving surface 36 which engages a surface 37 on the drum 26. A thrust collar 38 operates against the hub of the gear 35 and is engaged by a cross key 39 arranged in a slot 40 in the shaft 24. A push pin 41 operates against the cross key 39, the push pin forming a part of the usual friction device (not shown).

An out-board drum 42 is journaled on the shaft 20 and is adapted to be locked therewith by a driver 43 acting through the friction surfaces 43ª and 44, the driver being slidingly mounted on the shaft and locked against rotation by the spline 43ᵇ thrown into and out of engagement by the usual friction device (not shown) acting on a key 43ᶜ which engages the hub of the driver.

With this logging engine a very wide range of speeds may be obtained with relation to the main drum. A relatively high speed may be maintained with the trip drum and this may be accomplished without gears undesirably small and the intermediate shaft can be given a speed giving to the out-board drum a relative speed with relation to the trip drum and main drum which is desirable. At the same time the initial gearing permits of a high speed motor without a great number of gears for varying the speed. The heavy torque of the low speed drive involves fixed gears on the intermediate shaft. The light torque of the high speed utilizes the gears journaled on the shaft. This is desirable in that the rigidity of the shaft with its bearings is better able to carry this high torque.

What I claim as new is:—

1. In a logging engine, the combination of a main drum shaft; a main drum on the main drum shaft; an intermediate shaft; a drive shaft; a low gear connection comprising a gear on the drive shaft, gears on the intermediate shaft, and a gear at one side of the drum; and a high speed connection comprising a gear on the drive shaft, gears on the intermediate shaft, and a gear on the drum shaft at the opposite side of the drum from the first-mentioned gear.

2. In a logging engine, the combination of a main drum shaft; a main drum on the main drum shaft; an intermediate shaft; a drive shaft; a low gear connection from the drive shaft comprising gears on the intermediate shaft and a gear at one side of the main drum; a high speed connection from the drive shaft comprising gears on the intermediate shaft and a gear at the opposite side of the main drum from the low gear connection; an initial gear shaft; and a gear connection between the initial gear shaft and the drive shaft.

3. In a logging engine, the combination of a main drum shaft; a main drum on the main drum shaft; an intermediate shaft; a drive shaft; a low gear connection from the drive shaft comprising gears on the intermediate shaft and a gear at one side of the main drum; a high speed connection from the drive shaft comprising gears on the intermediate shaft, and a gear at the opposite side of the main drum from the low gear connection; a trip line drum on the drive shaft; an initial gear shaft; and a gear connection between the initial gear shaft and the drive shaft.

4. In a logging engine, the combination of a main drum shaft; a main drum on the main drum shaft; an intermediate shaft; a drive shaft; a low gear connection from the drive shaft comprising gears on the intermediate shaft and a gear at one side of the main drum; a high speed connection from the drive shaft comprising gears on the intermediate shaft, and a gear at the opposite side of the main drum from the low gear connection; a trip line drum on the drive shaft; a drum on the intermediate shaft; an initial gear shaft: and a gear connection between the initial gear shaft and the drive shaft.

5. In a logging engine, the combination of a main drum shaft; a main drum on the main drum shaft; an intermediate shaft; a drive shaft; a low gear connection from the drive shaft comprising gears on the intermediate shaft and a gear at one side of the main drum; a high speed connection from the drive shaft comprising gears on the intermediate shaft and a gear at the opposite side of the main drum from the low gear connection, the gears of one connection on the intermediate shaft being fixed on the shaft and the gears of the other connection on the intermediate shaft being journaled on said intermediate shaft.

In testimony whereof I have hereunto set my hand.

SIDNEY B. GORBUTT.